United States Patent
Milbredt

(10) Patent No.: US 6,584,641 B1
(45) Date of Patent: Jul. 1, 2003

(54) BRAKE AND STEERING LOCK FOR CASTOR

(75) Inventor: Manfred Milbredt, Remscheid (DE)

(73) Assignee: Tente-Rollen GmbH & Co., Wermelskirchen (DE)

( * ) Notice: Subject to any disclaimer, the term of this patent is extended or adjusted under 35 U.S.C. 154(b) by 85 days.

(21) Appl. No.: 09/807,649

(22) PCT Filed: Aug. 1, 2000

(86) PCT No.: PCT/EP00/07434

§ 371 (c)(1),
(2), (4) Date: Apr. 12, 2001

(87) PCT Pub. No.: WO01/14153

PCT Pub. Date: Mar. 1, 2001

(30) Foreign Application Priority Data

Aug. 21, 1999 (DE) .................................. 299 14 681 U

(51) Int. Cl.$^7$ .............................................. B60B 33/00
(52) U.S. Cl. ...................................... 16/35 R; 188/1.12
(58) Field of Search ........................ 16/35 R; 188/1.12

(56) References Cited

U.S. PATENT DOCUMENTS

| 3,988,800 | A | * | 11/1976 | Sachser | 16/35 R |
|---|---|---|---|---|---|
| 4,414,702 | A | * | 11/1983 | Neumann | 16/35 R |
| 4,677,706 | A | * | 7/1987 | Screen | 16/35 R |
| 4,722,114 | A | * | 2/1988 | Neumann | 16/35 R |
| 4,815,161 | A | * | 3/1989 | Timmer et al. | 16/35 R |
| 4,998,320 | A | * | 3/1991 | Lange | 16/35 R |
| 5,014,391 | A | * | 5/1991 | Schulte | 16/35 R |
| 5,139,116 | A | * | 8/1992 | Screen | 16/35 R |
| 5,184,373 | A | * | 2/1993 | Lange | 16/35 R |
| 5,242,035 | A | * | 9/1993 | Lange | 16/35 R |
| 5,303,450 | A | | 4/1994 | Lange | |
| 5,503,416 | A | * | 4/1996 | Aoki et al. | 16/35 R |
| 5,774,936 | A | | 7/1998 | Vetter | |
| 6,321,878 | B1 | * | 11/2001 | Mobley et al. | 188/1.12 |

FOREIGN PATENT DOCUMENTS

| CH | 607 958 | * | 12/1978 |
|---|---|---|---|
| DE | 1755789 | | 5/1972 |
| DE | 2347900 | | 4/1974 |
| DE | 2721375 | | 11/1978 |
| DE | 36 02 916 | * | 6/1987 |
| DE | 4318546 | | 12/1994 |

* cited by examiner

Primary Examiner—Gary S. Hartmann
(74) Attorney, Agent, or Firm—Martin A. Farber

(57) ABSTRACT

A castor (1) has a securing device (V) for blocking running action and/or steering action of a wheel (2) mounted in a fork (3). A mounting of the fork (3) permits pivoting about a vertical axis (y—y). A push rod (11) operates an integrally formed combination part (K) located at the fork for providing functions of braking-blocking and/or steering blocking formation. The push rod (11) carries a plate (23) configured for interacting with fork-mounted steering-blocking and braking-blocking parts of the combination part (K), which has steering-blocking mating protrusions (25) and braking-blocking means (26), these being located in spaced-apart planes (E'—E', E"—E").

16 Claims, 5 Drawing Sheets

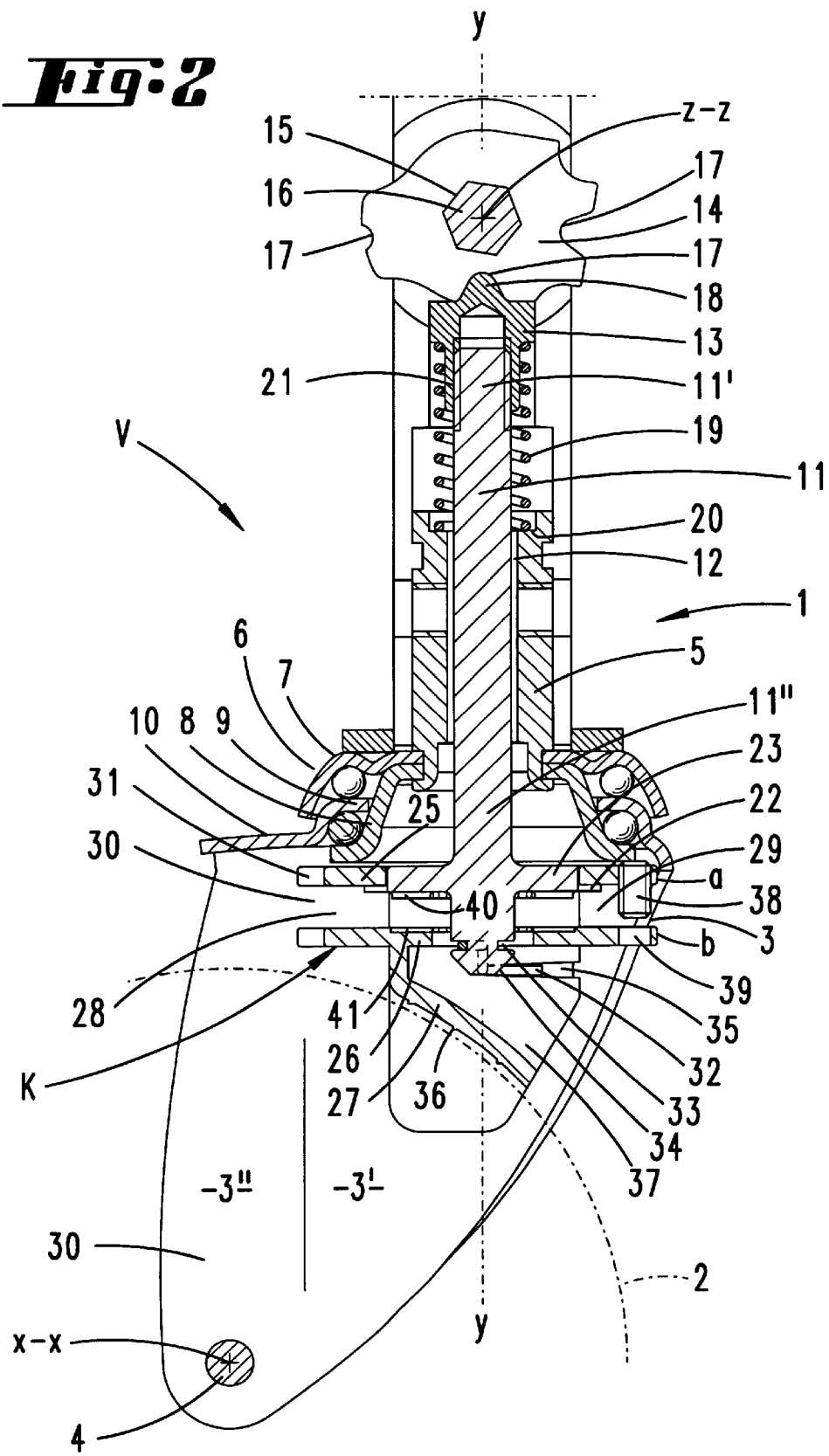

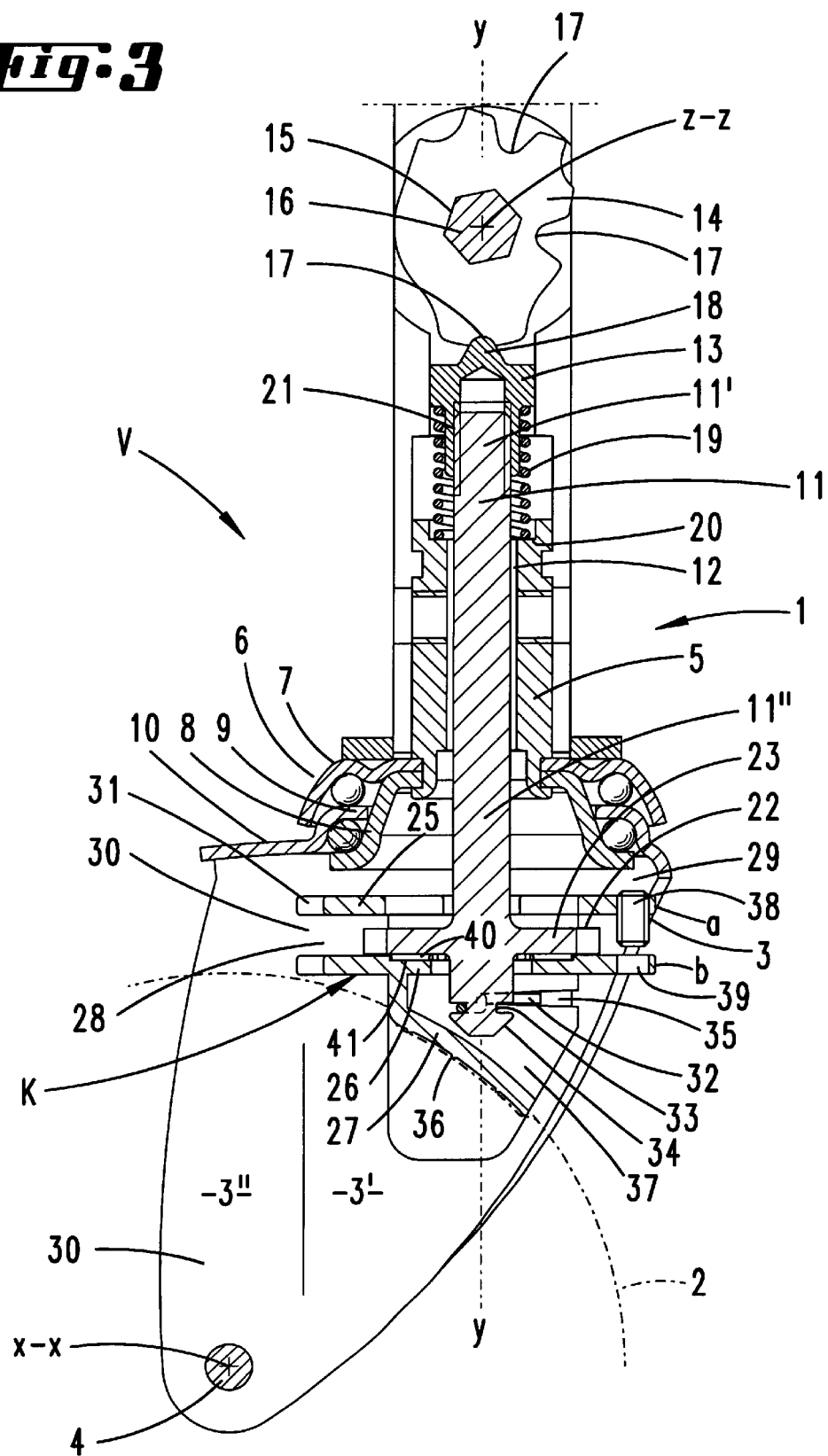

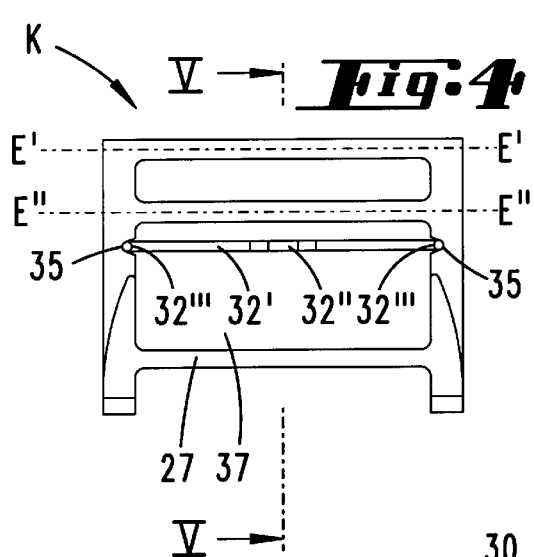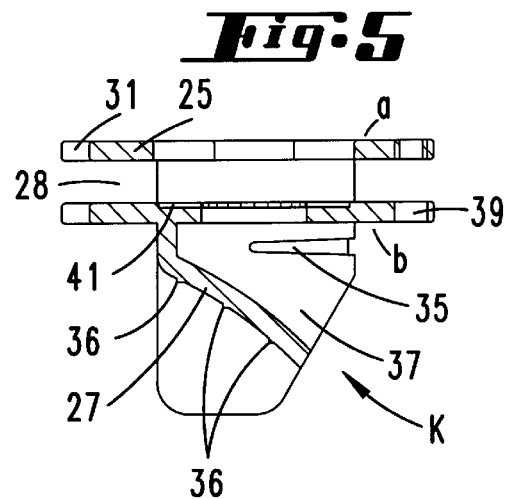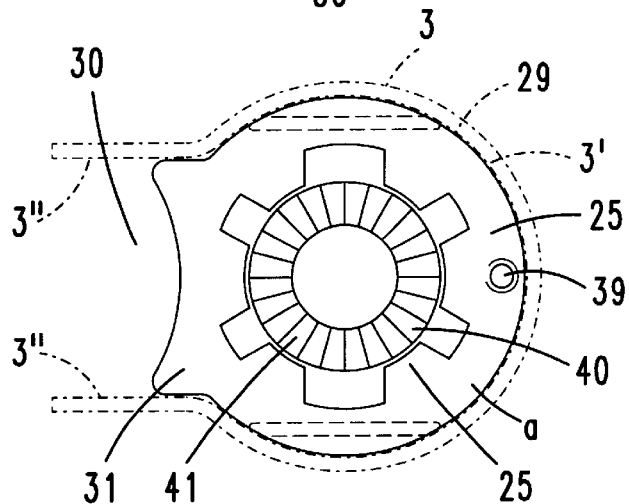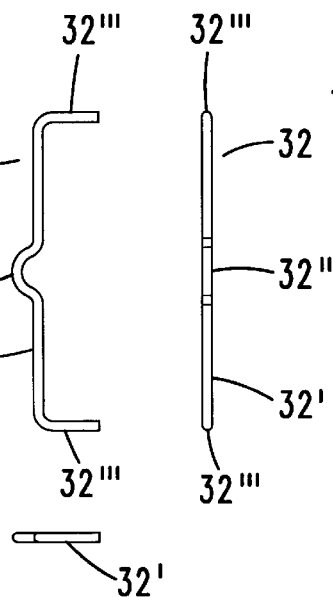

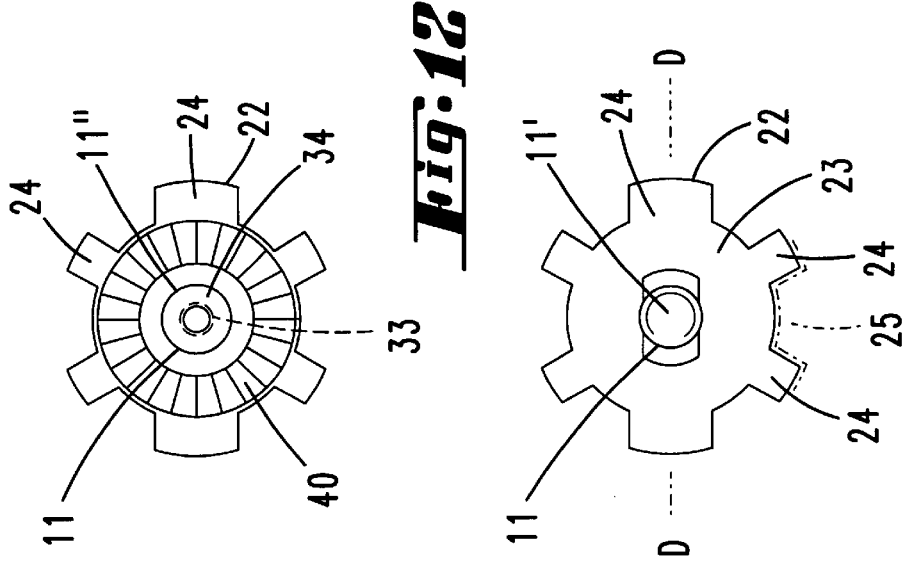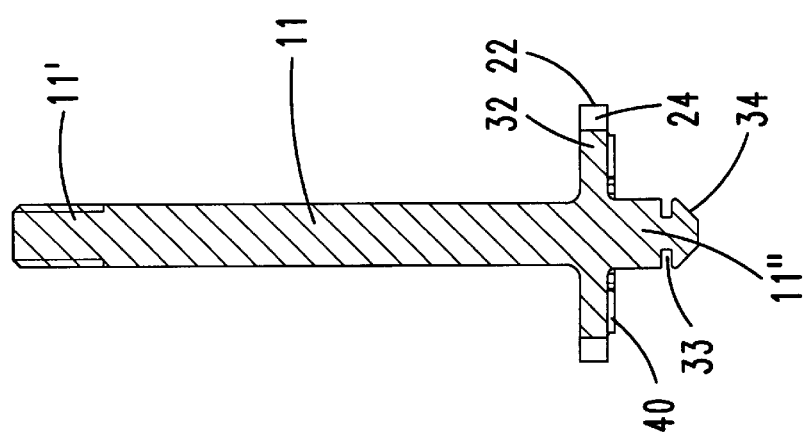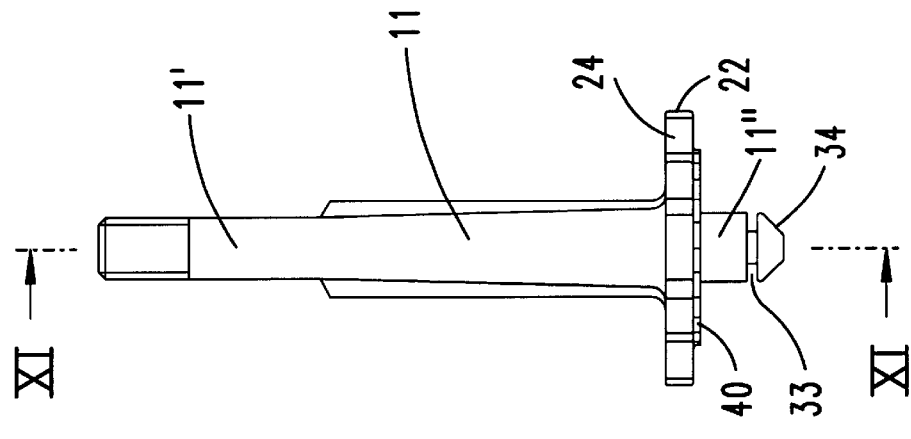

BRAKE AND STEERING LOCK FOR CASTOR

FIELD AND BACKGROUND OF THE INVENTION

The invention relates to a castor having a securing device for blocking the running and/or steering action of the running wheel mounted in a fork, which fork itself is mounted such that it can be pivoted about a vertical axis, having an actuating push rod, at the running-wheel end of which a braking-blocking and/or steering-blocking formation is formed, the push rod also interacting with fork-mounted steering-blocking mating protrusions.

A castor having a securing device of this type is known in a wide variety of embodiments; you are referred, for example, to DE-A 17 55 789 and DE-A 23 47 900. These forerunners provide, as the usable functional positions, for the fork and the running wheel to be blocked, also for the fork to be pivotable and the running wheel to be capable of running freely—the trailing side being formed of its own accord here—and finally provides for a position in which the pivoting movement of the fork is blocked and the castor can rotate freely. This renders a castor, for all practical purposes, into a fixed castor. The actuating push rod, which can be moved into the different positions by a control cam which crosses over its axis, is subject to the action, in the restoring direction, of a helical compression spring which is plugged on to the stem of the push rod and is supported on a fork pin. Both the forerunners mentioned comprise a large number of parts and therefore involve high production and installation outlay.

SUMMARY OF THE INVENTION

It is an object of the invention to configure a castor of the generic type such that it is structurally more straightforward and more favourable for installation.

This object is achieved first and foremost, in the case of a castor with a securing device having the features of claim 1, by a combination part on which both the steering-blocking mating protrusions and the braking-blocking means, these being located in spaced-apart planes, are formed, the braking-blocking and/or steering-blocking formation of the push rod being located in a neutral position between these planes. Such a combination part reduces the number of parts. In addition, it performs tasks which go beyond the introduction of forces for the push rod. The above-mentioned elements are additionally stabilised in relation to one another. This also serves to simplify the installation. The initial switching state is a neutral position, from which the braking-blocking and/or steering-blocking formation can be displaced by an extremely short distance in opposite directions in order to move into the respective other functional position. It is advantageous then for the combination part to be formed as an integral part. This can be accomplished very well by moulding. Accordingly, it is not necessary for the combination parts to be combined from a plurality of individual parts to form a structural unit. Such a multifunctional combination part is accommodated, for protection, in a freely moveable, but rotationally blocked, manner in an inner space of the fork. The rotational blocking can easily be achieved by utilising the parallel arrangement, which is usually present anyway, of the fork legs as guide surfaces. The movement is oriented vertically. For all practical purposes, the combination part is just fitted in and also secured. In this respect, it is provided that the combination part is fastened on the push rod. The fastening is resilient. The spring functions as a connecting element between the combination part and the push rod. For long-term functioning, there is provided a wire fastening spring which, in the fastening state, is positioned in a circumferential groove of the push rod. The corresponding securing can be achieved, without the classic fastening means, by the push rods, at the running-wheel end, having an introduction cone for deflecting the wire spring in the course of latching installation. A structurally advantageous solution is provided if the wire fastening spring is a U-clip, the U-crosspiece of which has a deflection following approximately half the circumferential groove. This deflection is held securely in the region of the groove recess. It is advantageous in terms of arrangement here for the U-legs of the wire fastening spring to be accommodated in retaining grooves of the combination part. A further favourable feature of the invention is that the combination part has a braking section which is adapted to the running-wheel curvature and is formed underneath the plane of the braking-blocking means. This avoids exposed braking press-edges. The actual braking surface may also be provided with roughened formations, for example transverse ribbing located parallel in space to the geometrical axis of the running wheel. It is then provided that the wire spring passes through a chamber formed between the braking-blocking and/or steering-blocking formation and the braking section. This chamber is open in the direction away from the running wheel, so that the wire spring is accessible for release at all times. This facilitates installation, and also any possible dismantling operation. This is because, once the running wheel has been removed, the combination part can easily be drawn off, and replaced by a new combination part, in the axial direction of the push rod. For position adjustment of the securing device, it proves favourable to provide on the combination part an adjusting screw for supporting and adjusting the combination part in relation to a bearing or fork section of the castor, this section being disposed above the chamber. The adjustment is correspondingly stepless. The procedure here, in concrete terms, is such that the adjusting screw is accommodated by a thread in the combination part in the plane of the steering-blocking means. To this extent, the adjusting screw is also accommodated in a protected manner. The procedure here is also such that a through-passage opening is formed in the plane of the braking-blocking means in order to access the adjusting screw for actuation. Finally, the invention proposes that the steering-blocking mating protrusions are designed for rotational blocking, defining at least one position, of the fork. A rotary latching position going beyond the 360° latching-position would then be located along the diametral line. Lastly, it proves advantageous for precision rotational blocking to be provided between the braking-blocking and/or steering-blocking formation and the braking-blocking means, which is closer to the running wheel. As a result, it is not just the case that the running wheel is braked, but also, at the same time, that the fork is prevented from rotating. Classic radially oriented tooth/gap engagement may be provided here.

BRIEF DESCRIPTION OF THE DRAWINGS

The subject matter of the invention is explained in more detail hereinbelow with reference to an exemplary embodiment illustrated in the drawing, in which:

FIG. 2 shows the same vertical section with the push rod located in a rotation-blocking position, FIG. 3 shows the same vertical section again with the push rod located in a braking position and with simultaneous rotational blocking of the fork of the castor, FIG. 4 shows the combination part on its own, as seen in the direction of the chamber of the same, with associated wire spring, FIG. 5 shows the section along line V—V in FIG. 4, without the spring, FIG. 6 shows the plan view of FIG. 5, FIG. 7 shows the plan view of the wire fastening spring, showing the U-shaped configuration, FIG. 8 shows a view in the direction of the narrow side of the wire spring, FIG. 9 shows a view in the direction of one of the U-legs of the wire spring, FIG. 10 shows the actuating push rod on its own, to be precise in side view, FIG. 11 shows the section along line XI—XI in FIG. 10, FIG. 12 shows the plan view of the push rod, and FIG. 13 shows the bottom view of the push rod.

DETAILED DESCRIPTION OF THE PREFERRED EMBODIMENTS

Figure 1:
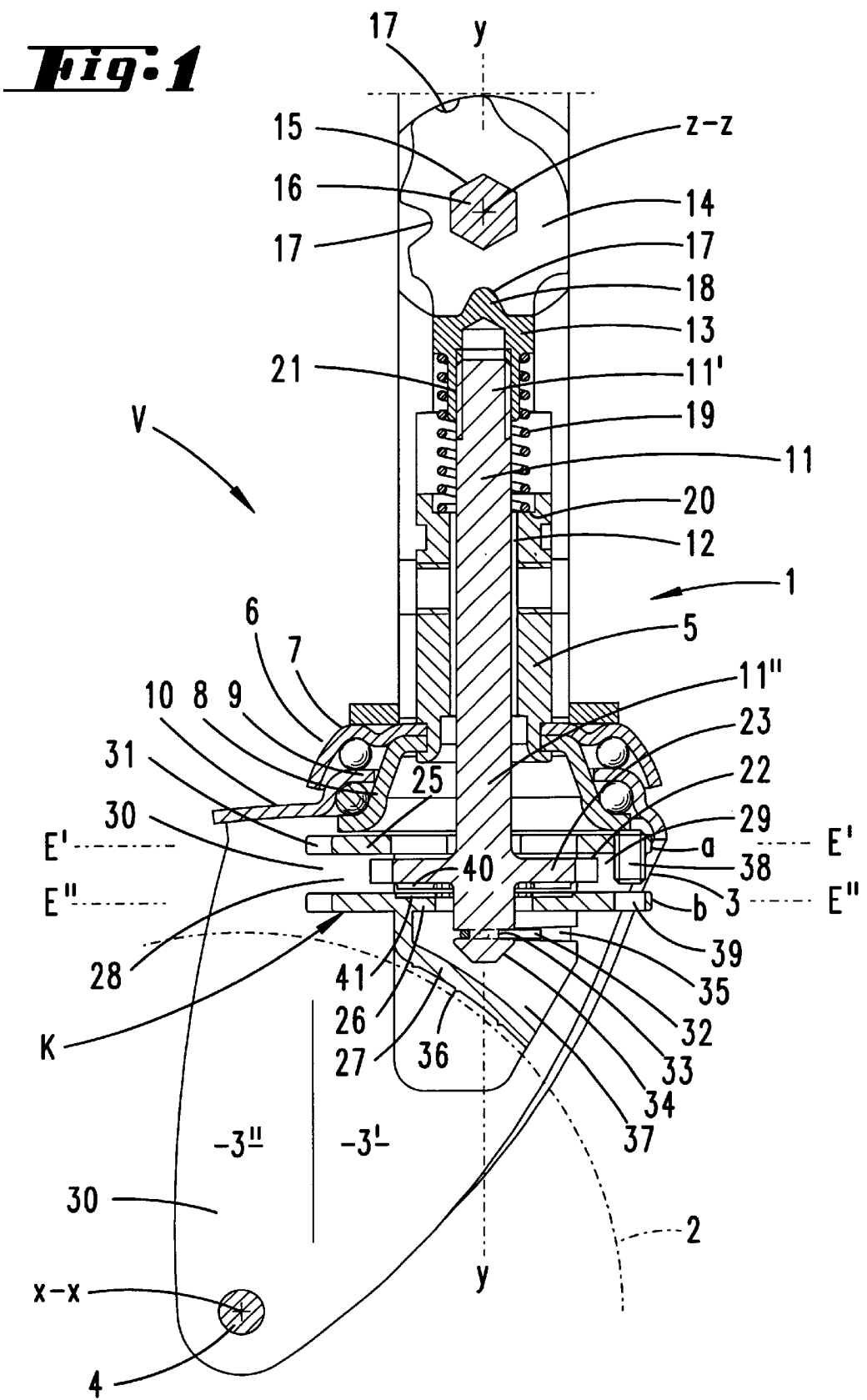
FIG. 1 shows a vertical section through the castor with the push rod located in a neutral position.

The castor 1 illustrated is provided with a securing device V. This effects blocking of the running and/or steering action.

The blocking of the running action is correspondingly converted into braking of a running wheel 2; the blocking of the steering action, in contrast, has the effect of securing a rotatably associated fork 3.

The running wheel 2 rotates about a horizontal geometrical axis x—x. The corresponding physical axis has the reference numeral 4.

The fork 3 pivots about a vertical geometrical axis y—y. This is embodied by an encased pin 5. The latter is positioned, in a manner in which it is secured against rotation, in an accommodating hollow of the mobile object provided with the castors 1.

The geometrical axes x—x and y—y are spaced apart from one another to the extent where the sought-after steerability which is typical of castors is achieved. The trailing side is on the left in the drawing illustration.

The pin 5 extends from the upper side of a bearing, preferably of a ball bearing 6. A perforated border 9 of a base 10 of the fork 3 is gripped and supported, with rotary mounting, between the upper race 7 and lower race 8 of the bearing.

The pin 5 has a push rod 11 passing through it. As can be gathered from FIG. 12, the push rod has a non-round cross-section. An axially oriented guiding mount 12 in the pin 5 has a correspondingly contoured cross-section. The push rod 11, accordingly, is secured against rotation and can only be displaced vertically along the axis y—y.

The upper end of the push rod 11 merges into a screw-connected push-rod head 13. This has a control cam 14 acting upon it. The latter is mounted for rotary actuation about a horizontal geometric axis z—z. A hexagonal through-passage 15 is located in the centre of the control cam 14. A correspondingly cross-sectionally configured control shaft 16 of an actuating arrangement (not illustrated specifically) engages in this through-passage.

The end surface of the basically disc-shaped control cam 14 has depressions 17 which are spaced apart by different distances from the axis and in which a protrusion 18 of the push-rod head 13 engages, in contact therewith.

The appropriate contact pressure is achieved via the force of a compression spring 19. The latter subjects the push-rod head 13 to loading via its upper-end spring turn. The other, lower-end spring turn has its castor-end abutment 20 in an annular channel of the upper end of the pin 5. The abutment at the upper end is provided by a stationary bearing location of the control shaft 16.

The end 11' of the push rod 11, which is directed away from the running wheel, can be adjusted axially in relation to the push-rod head 13, to be precise via a threaded engagement 21 of two parts.

The running-wheel end, 11" of the push rod 11 passes through the hole in the region of the bearing, or ball bearing 6, and extends into the region underneath the fork base 10. At this location, the said end 11" merges into a braking-blocking and/or steering-blocking formation 22. This is a horizontally oriented annular plate 23 which is rooted in the lateral wall of the push rod 11 and has, for all practical purposes, a tooth-structure end border, for which you are referred to FIGS. 10, 12 and 13. The structure comprises radially oriented protrusions 24 projecting freely beyond the plate border. These protrusions are disposed at identical angular spacing, but are of different widths. The wider protrusions 24 extend along a common diametral line D—D. The latter coincides, in directional terms, with the flattening of the push rod 11.

The steering-blocking formation 22 of the push rod 11, or the protrusions 24 thereof, are associated with steering-blocking mating protrusions 25. These are seated on a combination part K. The steering-blocking mating protrusions 25, leaving gaps corresponding to the width of the protrusions 24, form a matching mating contour into which, with alignments appropriate for engagement and with a corresponding switch position of the control cam 14, the annular plate 23 can latch.

The steering-blocking mating protrusions 25 are located in an upper deck a of the combination part K.

A lower deck b extends at a vertical spacing therefrom. Braking-blocking and steering-blocking means 26 are realised on this lower deck. These means are accessible for push-rod actuation and are provided, in concrete terms, in the form of a braking section 27.

With a corresponding switch position of the control cam 14, the push rod 11 and vertically displaceable combination part K are positioned heightwise such that the braking-blocking and/or steering-blocking formation 22 of the push rod 11 is located in a neutral position (FIG. 1), i.e. the annular plate 23 extends without contact between the two decks a, b, that is to say between the spaced-apart planes of the two, a sufficient free space 28 being left between these planes. The planes are respectively designated E'—E' and E"—E".

The combination part K, which is formed as an integral part, for example a plastics injection moulding, is accommodated in an inner space 29 of the fork 3 such that it can move freely in the vertical direction, but is rotationally blocked. The cross-sectional shape of the fork 3 is utilised for this purpose. This is made up, at least as far as an inner contour is concerned, of a circular-cylindrical section 3' and two outwardly leading, wing-like, rectilinear and parallel sections 3". The first-mentioned section 3' extends over a good three-quarters of a circle and opens via parallel section 3". The corresponding opening is designated 30 (see FIG. 6). A protrusion 31 which projects beyond the circular outline of the vertically crosspiece-connected deck a and b projects into this opening. As can be gathered, this protrusion has a rotation-blocking effect.

The combination part K is thus guided and, furthermore, fastened exclusively on the push rod 11. It is hung in the guiding inner space 29 and the rotation-preventing opening 30 of the fork 3. The fastening is resilient, i.e. relative movements between the push rod 11 and the combination part K are not prevented. A wire spring 32 serves for corresponding fastening. This spring, in the fastening state, is positioned in a circumferential groove 33 of the push rod 11, and more precisely of the running-wheel end 11" of the latter. At the running-wheel end, an introduction cone 34 is disposed upstream of said end 11". This introduction cone deflects the free-span U-crosspiece 32' of the wire spring 32, which is configured in the form of a U-clip, to give straightforward latching installation. As far as the clip configuration of the wire fastening spring 32 is concerned, you are referred to FIG. 7. It can also be gathered there that the U-crosspiece 32' of the wire spring 32 has a deflection 32" following approximately half the circumferential groove 33. The inner contour of this deflection corresponds essentially to the diameter of the base of the circumferential groove 33.

The U-legs, which are angled in the same direction and are designated 32''', can also be gathered from the above-mentioned figure. These U-legs are accommodated in matching, horizontally oriented retaining grooves 35 of the combination part K. The retaining grooves 35 themselves form the push-in limiting stop by way of the respective groove end. The groove ends are located such that the U-crosspiece 32' intersects the axis y—y. The inlet of the retaining grooves 35 may diverge outwards to a slight extent in relation to the flanks of these grooves, so that introduction is facilitated. The U-legs 32''' are expediently easy to move in the outward direction. They thus have a clamping or gripping action in relation to the retaining grooves 35.

The end of the ram 11 itself in this location, moreover, secures the merely plug-connected wire body from being lost since it is positioned with blocking action upstream of the U-crosspiece 32', which extends on the trailing side of the castor 1.

As may further be gathered from the drawing illustration, the combination part K has a braking section 27 adapted to the running-wheel curvature. The braking section 27 extends underneath the plane E"—E", that is to say that of the braking-blocking means 26. The braking section 27 carries transverse ribs 36, directed towards the running surface of the running wheel 2, with a correspondingly brake-enhancing action.

The rear side of the wall forming the braking section 27 forms the lower termination of the chamber 37 which is open on the widening-out side and, in the upper region, has the U-crosspiece 32' of the wire fastening spring 32 passing through it. The groove 35 securing the spring body is spaced apart by such a distance that it is also still possible to achieve an upwardly directed movement of the push rod 11.

The braking-blocking and/or steering-blocking formation 22, which in the basic position resides in the free space 28, can have its setting adjusted. For this purpose, an adjusting screw 38 is provided on the combination part K. This screw supports the combination part K, which is, as it were, suspended on the push rod 11, against the bearing or fork section, which is disposed above the chamber 37, of the castor 1, that is to say the lower race 8 of the ball bearing 6.

It can be gathered that the adjusting screw 38 is accommodated by a thread in the combination part K in the plane E'—E' of the steering-blocking means, of the steering-blocking mating protrusions 25. The adjusting screw 38 still projects into the free space 28 by way of its actuating end. In order to access the screw for adjustment purposes, a through-passage opening 39 for an adjusting tool on the deck b is formed in the plane E"—E" of the braking-blocking means 26.

It should also be pointed out, as far as the braking-blocking means 26 are concerned, that precision rotational blocking is provided between the braking-blocking and/or steering-blocking formation 22 and the braking-blocking means 26, which is closer to the running wheel. Radially oriented teeth 40 of a toothed rim thus extend from the underside of the annular plate 23. This toothed rim extends concentrically in relation to the push rod 11. Said teeth 40 interact with tooth gaps 41 on the upper side of the braking-blocking means 26, to be precise in the form of a congruent mating toothed rim.

The castor with a securing device V functions as follows: the switch position in FIG. 1 allows the fork 3 to pivot freely and the running wheel 2 to roll freely. In this position, the braking-blocking and/or steering-blocking formation 22 has moved out of the region of action of the steering-blocking mating protrusions 25 and of the region of the braking-blocking means 26. The push-rod 11 is stopped precisely in this respect against the control cam 14, in the direction of which it is loaded by the spring 19. Precision adjustment may, as has been described, be carried out via the adjusting screw 38. The wire spring 32 holds the combination part K precisely in a vertical position.

Rotation of the control cam 14 into the next position produces the position which can be gathered from FIG. 2, in which exclusively the pivoting movement of the fork 3 is blocked. The spring 19 has displaced the push rod 11, which is released to a corresponding extent, in the upward direction. The steering-blocking formation 22 moves with blocking action into the steering-blocking mating protrusions 25. The wire spring 32 is curved upwards, that is to say tensioned, in the region of its U-crosspiece 32' here. The force of the compression spring 19, however, is greater. It is not possible for the combination part K to be displaced upwards as well since it is supported on the ball bearing 6 via adjusting screw 38. The running wheel 2 can be rotated freely.

FIG. 3 shows a position in which the running wheel 2 is braked and rotation is blocked. The braking-blocking means 26 is pressed into the running surface of the running wheel 2. The combination part K is displaced downwards by correspondingly downwardly directed displacement of the push rod 11, the annular plate 23 of which comes into contact with the upper side of the braking-blocking means 26. This also takes place counter to the restoring force of the compression spring 19 and of the wire fastening spring 32. Simultaneously or subsequently, the teeth 40 also move into the tooth gaps 41, so that it is not only the case that the running wheel 2 is braked, but also that the fork 3 is prevented from rotating. If teeth are positioned one upon the other, this produces the latching position along with the easily occurring residual pivoting of the fork 3. The rotation-preventing means then latch in. This position is also produced by the rotary displacement of the control cam 14.

The rotational blocking of the fork 3, which produces the functioning of a fixed castor, is achieved via the wider protrusions 24, which engage in correspondingly wider gaps of the steering-blocking mating protrusions 25. At least one such latching-in position is provided. This is based on the main alignment of the mobile object.

I claim:

1. Castor (1) comprising a running wheel, a fork holding the wheel, and a securing device (V) located adjacent to the wheel for blocking a running and/or a steering action of the running wheel (2), said fork (3) being pivotable about a vertical axis (y—y) of the castor, the castor further comprising a push rod (11) for actuating the securing device, and the securing device including steering-blocking mating protrusions (25) and braking-blocking means (26) spaced apart from each other along the vertical axis and being aligned with the fork, wherein the securing device further comprises a braking-blocking and/or steering-blocking formation (22) extending from the push rod in a plane transverse to the vertical axis, the push rod (11) also interacting with the steering-blocking mating protrusions (25) of the securing device, wherein a combination part (K) is constituted by both the steering-blocking mating protrusions (25) and the braking-blocking means (26) of the securing device that are located in spaced-apart planes (E'—E', E"—E"), the braking-blocking and/or steering-blocking formation (22) of the push rod (11) being located in a neutral position between the planes (E'—E', E"—E") during a running and a steering of the castor wheel, and wherein the combination part (K) is fastened on the push rod.

2. The castor according to claim 1, wherein combination part (K) is formed as an integral part.

3. The castor according to claim 1, wherein the combination part (K) is accommodated in a freely moveable, but rotationally blocked, manner in an inner space (29) of the fork (3).

4. The castor according to claim 1, wherein the combination part (K) has a braking section (27), said braking section is adapted to a running-wheel curvature and is formed underneath a first of said planes (E"—E") of the braking-blocking means (26).

5. The castor according to claim 1, wherein fastening is resilient.

6. The castor according to claim 1, wherein a wire fastening spring (32), in a fastening state, is positioned in a circumferential groove (33) of the push rod (11).

7. The castor according to claim 6, wherein the push rod (11), at the running-wheel end, has an introduction cone (34) for deflecting the wire fastening spring (32) in a course of latching installation.

8. The castor according to claim 6, wherein the wire fastening spring (32) is a U-clip, a U-crosspiece (32') of the wire fastening spring (32) has a deflection (32") following approximately half a second circumferential groove (35).

9. The castor according to claim 6, wherein U-legs (32''') of the wire fastening spring (32) are accommodated in retaining grooves (35) of the combination part (K).

10. The castor according to claim 6, wherein the wire fastening spring (32) passes through a chamber (37) formed between the braking-blocking and/or steering-blocking formation (22) and a braking section (27).

11. The castor according to claim 10, wherein provided on the combination part (K) is an adjusting screw (38) for supporting and adjusting the combination part (K) in relation to a bearing or fork section of the castor (1), said section being disposed above the chamber (37).

12. The castor according to claim 11, wherein the adjusting screw (38) is accommodated by a thread in the combination part (K) in one of said planes (E'—E') of a steering-blocking means, of the steering-blocking mating protrusion (25).

13. The castor according to claim 10, wherein a through-passage opening (39) is formed in a first of said planes (E"—E") of the braking-blocking means (26) in order to access the adjusting screw (38) for actuation.

14. The castor according to claim 1, wherein the steering-blocking mating protrusions (25) are provided for rotational blocking, defining at least one position, of the fork (3).

15. The castor according to claim 1, wherein precision rotational blocking is provided between the braking-blocking and/or steering-blocking formation (22) and the braking-blocking means (26), which is closer to the running wheel.

16. Castor (1) comprising a running wheel, a fork holding the wheel, and a securing device (V) located adjacent to the wheel for blocking a running and/or a steering action of the running wheel (2), said fork (3) being pivotable about a vertical axis (y—y) of the castor, the castor further comprising a push rod (11) for actuating the securing device, and the securing device including steering-blocking mating protrusions (25) and braking-blocking means (26) spaced apart from each other along the vertical axis and being aligned with the fork, wherein the securing device further comprises a braking-blocking and/or steering-blocking formation (22) extending from the push rod in a plane transverse to the vertical axis, the push rod (11) also interacting with the steering-blocking mating protrusions (25) of the securing device, wherein a combination part (K) is constituted by both the steering-blocking mating protrusions (25) and the braking-blocking means (26) of the securing device that are located in spaced-apart planes (E'—E', E"—E"), the braking-blocking and/or steering-blocking formation (22) of the push rod (11) being located in a neutral position between the planes (E'—E', E"—E") during a running and a steering of the castor wheel, wherein the combination part further comprises a braking section extending from the braking-blocking means toward the wheel and being curved to mate with a curvature of the wheel upon being pressed toward the wheel by the push rod, the steering blocking mating protrusions and the braking blocking means being formed as an integral assembly with the braking section.

* * * * *